May 20, 1930.  J. S. WOLLK  1,759,336
LIFE SAVING SWIMMING BELT
Filed Aug. 28, 1928
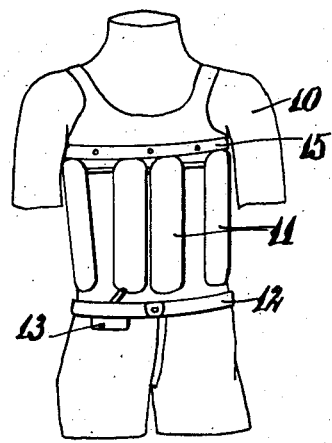
FIG.1.
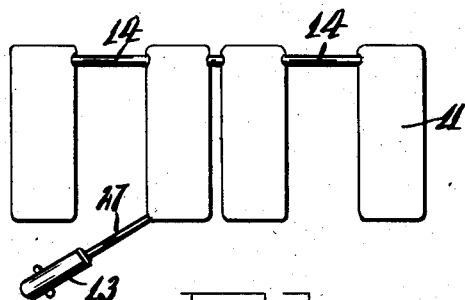
FIG.2.
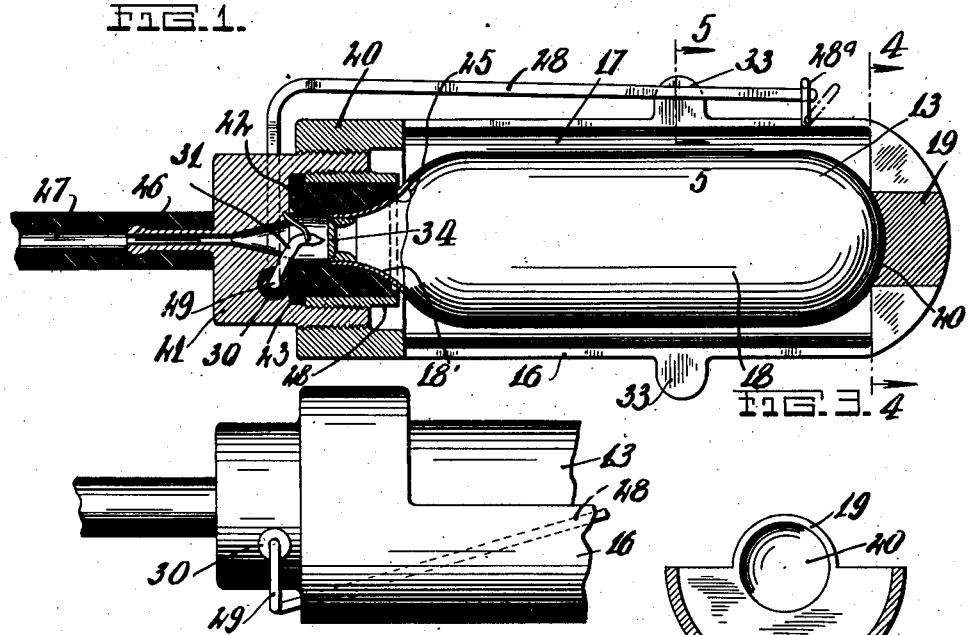
FIG.3.
FIG.6.
FIG.4.
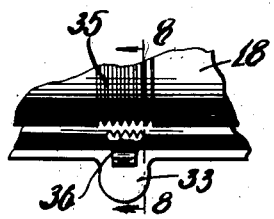
FIG.7.
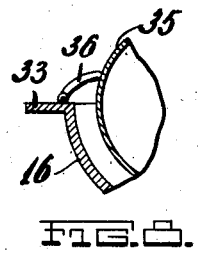
FIG.8.
FIG.5.
INVENTOR.
Joseph S. Wollk
BY
ATTORNEY Patented May 20, 1930

1,759,336

UNITED STATES PATENT OFFICE

JOSEPH S. WOLLK, OF NEW YORK, N. Y.

LIFE-SAVING SWIMMING BELT

Application filed August 28, 1928. Serial No. 302,500.

This invention relates generally to life preservers, and has more particular reference to a novel life preserver adapted for self-inflation.

The invention has for an object the provision of a device of the class mentioned which is of simple durable construction, desirable and efficient in action, and which can be manufactured and sold at a reasonable cost.

The invention proposes the use of a cartridge containing a highly compressed gas such as carbon dioxide ($CO_2$) and having puncturable end. This cartridge is supported in a bracket arranged for clamping it against a rubber gasket held in a stem member connected with pipes which in turn connect with inflation members arranged for being secured about the body of a wearer. A means is provided for puncturing the said end of the cartridge for releasing the compressed gas and allowing same to enter the inflation member.

For further comprehension of the invention, and of the object and advantages thereof, reference will be had to the following description and accompanying drawings, and to the appended claims in which the various novel features of the invention are more particularly set forth.

In the accompanying drawing, forming a material part of this disclosure:—

Fig. 1 is a view of the device applied upon a wearer.

Fig. 2 is a side elevational view of the device with the inflation members shown in a common plane.

Fig. 3 is a central longitudinal sectional view of the compressed gas holding portion of the device.

Fig. 4 is a vertical sectional view, taken on the line 4—4 of Fig. 3.

Fig. 5 is a vertical sectional view, taken on the line 5—5 of Fig. 3.

Fig. 6 is a fragmentary side elevational view of Fig. 3.

Fig. 7 is a fragmentary view of a portion of Fig. 3 showing in modified form thereof.

Fig. 8 is a vertical sectional view, taken on the line 8—8 of Fig. 7.

The reference numeral 10 indicates generally the user, and the inflation members 11 are shown engaged about his body. The wearer has a belt 12 which is used in holding the compressed gas portion 13 of the device. The inflation members 11 may be of any design or construction and have straps such as 15 for attaching to a wearer's body.

The compressed gas portion 13 of the device consists of a bracket 16 centrally arranged with a recess 17 for holding a gas containing cartridge 18, and the rear of the bracket is provided with a boss 19 formed with a niche 20 for receiving the rear of the cartridge 18, and the front portion of the bracket has an internally threaded flange 20. A stem member 21 is shown engaged within the flange 20 and is provided with a recess 22 holding a tubular gasket 23 by reason of a lock collar 28 threadedly engaged therein. This collar is formed with cuts 25 for engagement by a turning tool. The front of the stem member 21 has a reduced portion 26 engaging with the tube 27 connected with the inflation members of the device.

The handle 28 is pivoted within the stem member 21 as at 29 and is constructed against air leakage by reason of a rubber bushing 30 and held against accidental operation by a movable ring 28ª. Within the stem 21 and secured on the pivot portion 29 of the said handle is a puncture member 31 consisting preferably of a solid needle.

In operation of the device the bracket 16 may be loosened from stem 21 so that the cartridge 18 may be slipped out of the bracket, or the bracket 16 may be tightened upon the stem member 21 for forcing the cartridge against the tubular gasket 23 which is preferably of rubber. In the event that the user of the device is in distress, he may move the handle 28 for moving the needle 31 rearwards and puncturing the front end of the cartridge 18. The compressed gas then escapes out of the cartridge and flows thru the tube 27 into the inflation members 11. It is readily seen that this will support the wearer against drowning.

The bracket 16 is provided with side lugs 33 for turning purposes. The front of the cartridge is shown reduced at 18' and has an opened end normally sealed by a puncturable member 34.

In the modified form of the device disclosed in Figs. 7 and 8, the cartridge 18 is shown formed with a plurality of concentric cuts 35 and a serrated member 36 is shown pivotally mounted on the lugs 33 and movable against the cuts 35 as shown in full lines in Fig. 8. The dotted lines show the serrated member disengaged from the cuts 35.

After the bracket 16 has been tightly turned for moving the cartridge against the tubular gasket 23 it will be found to be very tightly engaged in this part. The serrated members 36 may be held against the cuts 35, while the bracket 16 is turned loose, and this simultaneously draws the cartridge 16 rearwards disengaging same from the tubular gasket 23.

It is to be understood that my device may be used not only in connection with garment life preservers, but also for inflating rubber boats, belts and the like.

While I have shown and described the preferred embodiment of my invention, it is to be understood that I do not limit myself to the precise construction herein disclosed and the right is reserved to all changes and modifications coming within the scope of the invention and as defined in the appended claims.

Having thus described my invention, what I claim as new, and desire to secure by United States Letters Patent is:—

1. In a device of the class described, a bracket formed with a recess for receiving a cartridge, a boss with a niche formed at one end of the bracket for forming an abutment for the rear of a cartridge engaged in the said recess, an internally threaded flange formed at the front end of the bracket, a stem member engaged therein, a tubular gasket secured within the stem member and arranged for receiving the front reduced portion of a cartridge within the said recess, a tube for connection with inflatable member secured on the stem, a compressed gas holding cartridge engaged in the said recess and having a puncturable front end, a means for forcing the cartridge out of engagement with the said gasket upon turning the bracket off of the stem, and means for puncturing the said end of the cartridge when desired.

2. In a device of the class described, a bracket formed with a recess for receiving a cartridge, a boss with a niche formed at one end of the bracket for forming an abutment for the rear of a cartridge engaged in the said recess, an internally threaded flange formed at the front end of the bracket, a stem member engaged therein, a tubular gasket secured within the stem member and arranged for receiving the front reduced portion of a cartridge within the said recess, a tube for connection with inflatable member secured on the stem, a compressed gas holding cartridge engaged in the said recess and having a puncturable front end, a means for forcing the cartridge out of engagement with the said gasket upon turning the bracket off of the stem, comprising a serrated member pivotally mounted on said bracket and manually engageable with concentric cuts formed on said cartridge, and means for puncturing the said end of the cartridge when desired.

3. In a device of the class described, a bracket formed with a recess for receiving a cartridge, a boss with a niche formed at one end of the bracket for forming an abutment for the rear of a cartridge engaged in the said recess, an internally threaded flange formed at the front end of the bracket, a stem member engaged therein, a tubular gasket secured within the stem member and arranged for receiving the front reduced portion of a cartridge within the said recess, a tube for connection with inflatable member secured on the stem, a compressed gas holding cartridge engaged in the said recess and having a puncturable front end, a means for forcing the cartridge out of engagement with the said gasket upon turning the bracket off of the stem, comprising a member movably mounted on said bracket and manually engageable with concentric cuts formed on said cartridge, and means for puncturing the said end of the cartridge when desired.

In testimony whereof I have affixed my signature.

JOSEPH S. WOLLK.